US00RE35909E

United States Patent [19]

Fondelius

[11] E Patent Number: Re. 35,909

[45] Reissued Date of Patent: Sep. 29, 1998

[54] SEAL HOUSING WITH HELICAL ELEMENT

[76] Inventor: Johan Fondelius, Varvsgatan 4 11729, Stockholm, Sweden

[21] Appl. No.: 766,837

[22] Filed: Dec. 13, 1996

Related U.S. Patent Documents

Reissue of:

[64] Patent No.: 5,513,856
Issued: May 7, 1996
Appl. No.: 330,145
Filed: Oct. 11, 1994

[30] Foreign Application Priority Data

Nov. 17, 1993 [SE] Sweden ..... 9303791

[51] Int. Cl.[6] ..... F16J 15/34

[52] U.S. Cl. ..... 277/352; 277/430; 277/408; 415/111; 415/170.1; 415/175

[58] Field of Search ..... 277/65, 67, 133, 277/134, 203; 415/110, 111, 170.1, 175, 180

[56] References Cited

U.S. PATENT DOCUMENTS

| | | | |
|---|---|---|---|
| 1,826,057 | 10/1931 | Dobbins . | |
| 2,329,990 | 9/1943 | Hornschuch . | |
| 3,004,782 | 10/1961 | Meermans . | |
| 3,076,412 | 2/1963 | Harker et al. . | |
| 3,273,906 | 9/1966 | Pennington . | |
| 3,558,238 | 1/1971 | Van Herpt . | |
| 3,693,985 | 9/1972 | Dillner . | |
| 4,243,230 | 1/1981 | Baker et al. . | |
| 4,795,167 | 1/1989 | Otsuka . | |
| 5,188,509 | 2/1993 | Shimanuki et al. . | |
| 5,195,867 | 3/1993 | Stirling . | |
| 5,336,048 | 8/1994 | Ganzon et al. . | |
| 5,553,868 | 9/1996 | Dunford | 277/65 |

FOREIGN PATENT DOCUMENTS

| | | |
|---|---|---|
| 1800888 | 5/1969 | Germany . |
| 31 37 692 A1 | 4/1982 | Germany . |
| 55-151196 | of 1980 | Japan . |

*Primary Examiner*—William A. Cuchlinski, Jr.
*Assistant Examiner*—John L. Beres
*Attorney, Agent, or Firm*—Menotti J. Lombardi

[57] ABSTRACT

A cavity in the housing, which confines the seal therewithin, has an annular wall surface which is modified to direct liquid from the cavity towards the impeller. In one embodiment, the wall surface has a helical land formed therein. In another embodiment, a helical-land forming insert is set within the cavity and in engagement with the wall surface.

3 Claims, 2 Drawing Sheets

SEAL HOUSING WITH HELICAL ELEMENT

Matter enclosed in heavy brackets [ ] appears in the original patent but forms no part of this reissue specification; matter printed in italics indicates the additions made by reissue.

BACKGROUND OF THE INVENTION

This invention pertains to seal housings, for use in rotary machines such as pumps or liquid mixers, and the like, and in particular to seal housings for mechanical face seals arranged between the hydraulic components of the machine and the driving motor therefor, as is typical in pumps of the centrifugal type.

A conventional centrifugal pump comprises a driving unit, such as an electric motor, and a pump housing connected via a driving shaft. In order to prevent the pumped medium from entering the electric motor via the shaft, and cause damage, some sort of seal is arranged between the pump housing and the motor. A typical seal is the so-called mechanical face seal which consists of a rotary seal ring and a stationary seal ring which are pressed towards each other by a biasing force.

Seals of the aforesaid type are very effective, providing that the two seal surfaces are even and undamaged. In order to effect a perfect sealing, there is often used an arrangement consisting of two mechanical seals with an intermediate, intervening oil chamber. In this way, one of the seals will always be lubricated and cooled by clean oil, and the risk of damage is greatly reduced. Of the two seals, the one which faces the pump housing, here called the lower seal, will always be exposed to be pumped medium, and damage can result if the pumped medium contains abrasive particulate. The latter is a circumstance which is common in mines and certain other industrial areas.

The lower seal is normally mounted in a cavity which has a cylindrical or conical form. If conical, the portion with the greater diameter confronts the pump housing. Conical form bas manufacturing reasons, but it is also used on the theory that particles, which enter the cavity, will be thrown out again by centrifugal force. In fact, however, pollutants are concentrated at the inner part of the cavity where they may damage the seal surfaces as well as the cavity wall. This phenomenon also occurs in seal housings where the cavity has a cylindrical-formed shape.

Concentration of pollutants proceeds from the fact that rotation of the pumped medium generates secondary flows of such a nature that rotating surfaces induce a radially outwards-directed flow, while stationary surfaces induce a radially inwards-directed flow. Particles within the seal housing will be thrown outwards to the cylindrical or conical wall surface by centrifugal force, the boundary layer flow along the wall surface then directing the particles within the housing toward the seal.

The particles are not transported back to the pump impeller, at the outlet of the seal housing, as the backwards directed flow is weaker than the inwards-directed flow, and because of the fact that the centrifugal force again throws the particles towards the inwards-directed boundary layer flow. The result is that particles which once have entered the seal housing will never leave it, but are concentrated in the inner part of the housing where they cause wear of the housing and the seal.

In order to diminish the risk of wear of the seal ring surfaces and the seal housing, there have been prior art attempts to change the flow pattern in the seal area. An example thereof is shown in U.S. Pat. No. 4,872,690, where an additional means is mounted which turns the flow and thus sometimes solves the problem.

According to the instant invention, the problem of changing the flow pattern in the seal housing of a centrifugal pump is solved by modifying the wall of the seal housing cavity.

SUMMARY OF THE INVENTION

It is an object of this invention to set forth an improved seal housing for a rotary machine, such as a pump or mixer for liquids, which comprises a driving motor, a hydraulic part with a rotary impeller connected to the motor via a shaft, and a mechanical face seal arranged within a cavity, in said seal housing, which cavity (a) has an annular wall surface, and (b) openly confronts the impeller, wherein the improvement comprises means on said annular wall surface defining a helical land, said means being cooperative in response to rotation of said shaft for directing liquid from said cavity toward said impeller.

Another object of this invention is to disclose a shaft seal housing, for a rotary machine which has a fluid-working impeller, comprising a body, centrally-bored for journalling an impeller-driving shaft therein; wherein said body has a cavity, formed therein, which openly confronts said impeller; said cavity has an annular wall surface; and said wall surface has means, cooperative in response to rotation of said shaft, for directing liquid from said cavity toward said impeller.

Further objects of this invention, as well as the novel features thereof, will become apparent by reference to the following description, taken in conjunction with the accompanying figures.

DETAILED DESCRIPTION OF THE PREFERRED EMBODIMENTS

Figure 1:
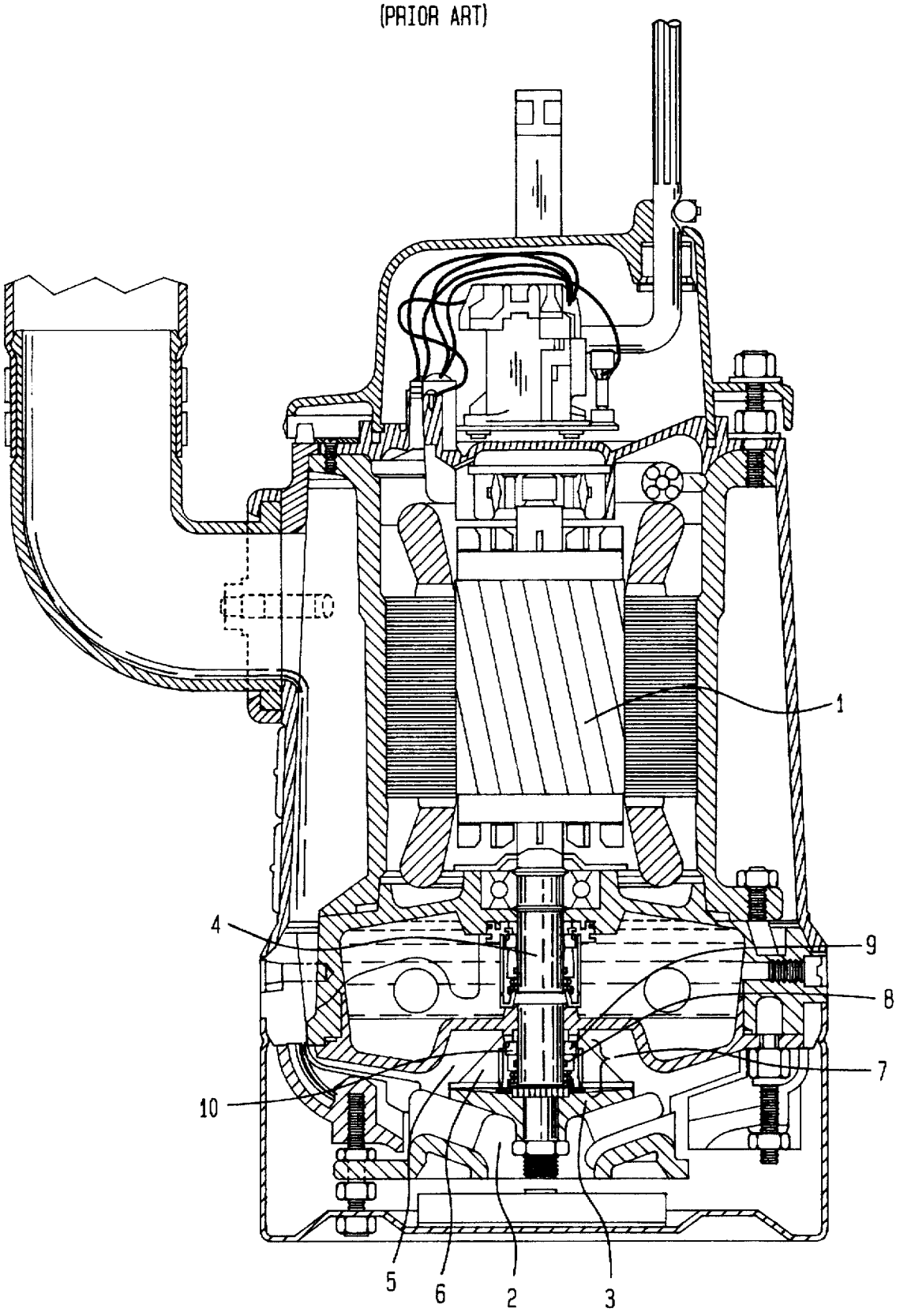
FIG. 1 (PRIOR ART)
FIG. 1 is an axially-taken cross-sectional view through a prior art centrifugal pump having a typical seal housing therein.

In FIG. 1, the pump has an electric motor driving unit 1, a hydraulic unit 2, with a pump impeller 3 connected to the driving unit 1 by a shaft 4. The seal housing 5 has a cavity 6 formed therein which confronts the impeller 3. Within the cavity 6, and about the shaft 4, is a mechanical face seal 7, the latter comprising a rotary sealing element 8, a stationary sealing element 9, and a compression spring 10 urging the two elements into engagement.

Figure 2:
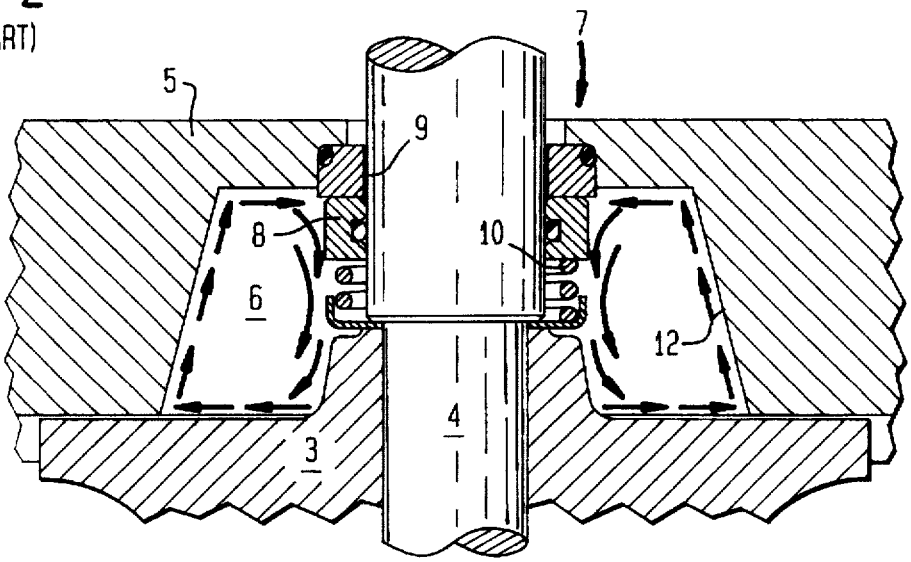
FIG. 2 (PRIOR ART)
FIG. 2 depicts a prior art seal housing, confronting an impeller, in which the common flow patterns are shown.

The aforesaid seal housing 5, cavity 6, seal 7 and shaft 4 are shown in greater detail and in enlargement in FIG. 2. The captive flows of liquid, within the cavity 6, are shown in FIG. 2 by the arrows. The liquid flows in loops in the cavity 6 which means that abrasive particulate stays within the cavity. Consequently, damaging wear subsequently occurs.

Figure 3:
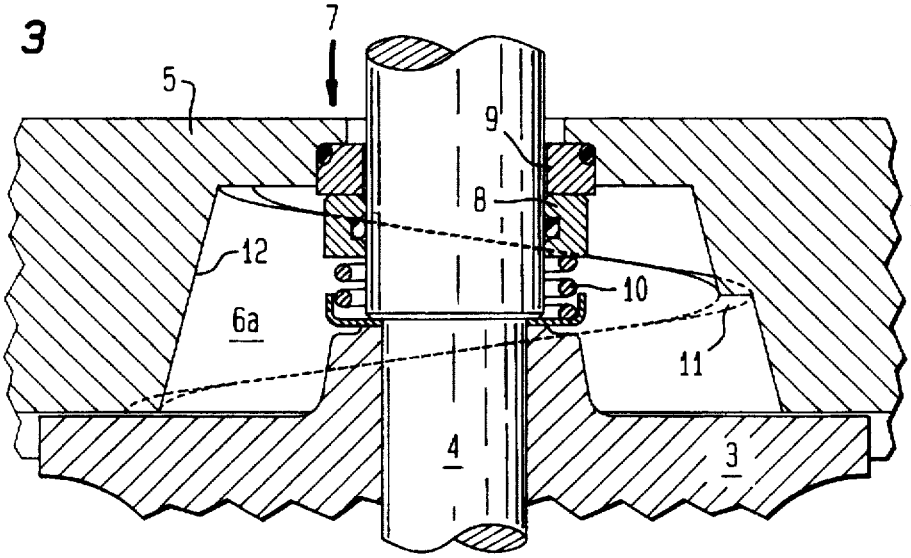
FIG. 3 is an illustration, like that of FIG. 2, in which, however, an embodiment of the invention is shown.

FIG. 3 depicts an embodiment of the invention. Here the cavity 6a has a helical land 11 formed in the annular wall surface 12 thereof. Now, particles that have entered the cavity 6a are transported by the boundary layer flows towards the bottom of the cavity 6a. By the design of the land 11, such migration of the particles is prevented by centrifugal force. Instead, the particle will be caught by the land 11 and follow it, helically, out of the cavity 6a towards the impeller 3.

The land 11 may have various inclinations and profiles, and a plurality of helical lands may be used, such being alternative embodiments of the invention.

Figure 4:
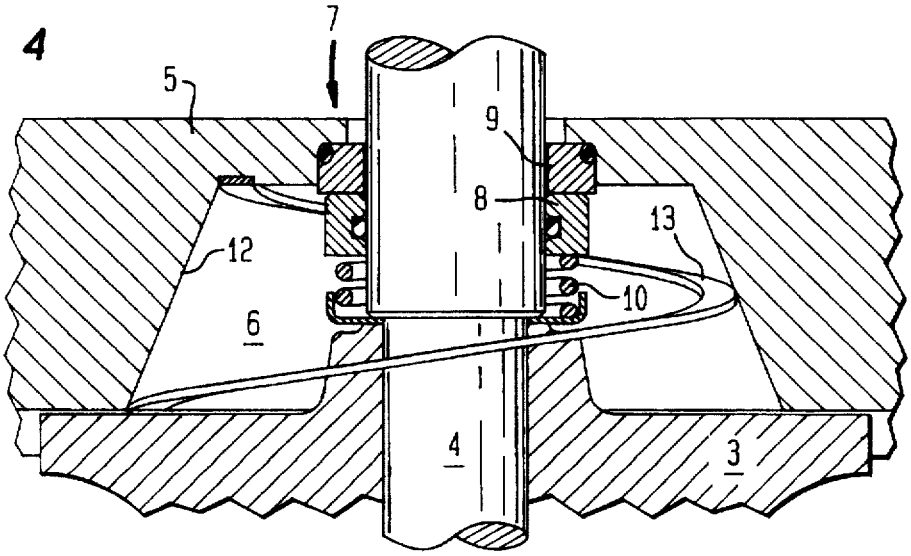
FIG. 4 is a view like that of FIGS. 2 and 3, albeit of an alternative embodiment of the invention.

In FIG. 4 an alternative embodiment of the invention is shown where, in lieu of a land 11 being formed in the annular wall surface 12 of the cavity 6, a helical insert 13 is set within the cavity 6 and in engagement with the wall surface 12.

While I have described my invention in connection with specific embodiments thereof it is to be clearly understood that this is done only by way of example and not as a limitation to the scope of the invention, as set forth in the objects thereof and in the appended claims.

I claim:

1. An improved housing for a pump which comprises a driving motor (1), a hydraulic part (2) with a rotary impeller (3) connected to the motor (1) by a shaft (4) and a seal housing (5) located between the motor (1) and the hydraulic part (2), the housing (5) contains a cavity (6) adjacent the impeller (3), within said cavity (6) and around the shaft (4) is a mechanical seal having a stationary sealing element (9), a rotary[,] sealing element (8), and a compression spring (10) urging the elements (8), (9) into engagement, wherein the improvement comprises:

said cavity (6) having a conical shape and an [annual] *annular* wall surface (12), and a [single] helical element (*11*), (13) [is positioned in said cavity (6)] spaced from said mechanical seal and [engaging] *extending* from top to bottom of said wall surface (12), whereby a liquid present near said wall surface (12) is directed toward said impeller (3) due to rotary motion that the liquid obtains when the shaft (4), *rotary* element (8) and spring (10) rotate.

*2. The improved housing for a pump according to claim 1, wherein said helical element is a helical land (11) formed in said annular wall surface (12) of said cavity (6).*

*3. The improved housing for a pump according to claim 1, wherein said helical element is a helical insert (13) positioned in said cavity, said helical insert engaging said annular wall surface (12) from said top to said bottom thereof.*

* * * * *